US007224909B2

(12) United States Patent
Remedios et al.

(10) Patent No.: US 7,224,909 B2
(45) Date of Patent: May 29, 2007

(54) METHOD AND SYSTEM FOR SELECTIVE OPTICAL PAYLOAD CANCELLATION

(75) Inventors: Derrick Remedios, Ottawa (CA); Benjamin Wai Chan, Ottawa (CA); Patrick Chilufya Chimfwembe, Ottawa (CA); Ping Wai Wan, Ottawa (CA)

(73) Assignee: Tropic Networks Inc., Kanata, Ontario (CA)

( * ) Notice: Subject to any disclaimer, the term of this patent is extended or adjusted under 35 U.S.C. 154(b) by 726 days.

(21) Appl. No.: 10/635,561

(22) Filed: Aug. 7, 2003

(65) Prior Publication Data
US 2004/0033081 A1 Feb. 19, 2004

Related U.S. Application Data

(60) Provisional application No. 60/429,552, filed on Nov. 29, 2002.

(51) Int. Cl.
*H04B 10/04* (2006.01)
(52) U.S. Cl. ........................................ 398/198; 359/249
(58) Field of Classification Search ................ 398/198; 359/239, 249, 276, 284, 286
See application file for complete search history.

(56) References Cited

U.S. PATENT DOCUMENTS

| 5,488,503 | A | * | 1/1996 | Schaffner et al. ........... 359/245 |
| 5,892,606 | A | | 4/1999 | Fatehi et al. |
| 5,900,621 | A | * | 5/1999 | Nagakubo et al. .......... 250/205 |
| 6,339,660 | B1 | * | 1/2002 | Buchmann et al. ............ 385/1 |
| 6,373,610 | B1 | * | 4/2002 | Takehana et al. ........... 398/158 |
| 6,831,774 | B2 | * | 12/2004 | Fujiwara et al. ............ 359/326 |
| 7,006,771 | B1 | * | 2/2006 | Miyata et al. .............. 398/198 |

OTHER PUBLICATIONS

Brown, K.M., and Dennis, J.E., "Derivative Free Analogues of the Levenberg-Marquardt and Gauss Algorithms for Nonlinear Least Squares Approximation", Numberical Methods, vol. 18, 1972, pp. 289-297.
Levenberg, K., "A Method for the Solution of Certain Nonlinear Problems in Least Squares", Quarterly of Applied Mathematics, vol. 2, 1944, pp. 164-168.
Marquardt, D.W., "An Algorithm for Least Squares Estimation of Nonlinear Parameters", Journal of the Society of Industrial and Applied Mathematics (SIAM), vol. 11, 1963, pp. 431-441.
Kirkpatrick, S., Gelatt, C.D., and Vecchi, M.P., "Optimization by Simulated Annealing", Science, 220 (4598), 1983, pp. 671-680.

* cited by examiner

*Primary Examiner*—Leslie Pascal
(74) *Attorney, Agent, or Firm*—Victoria Donnelly

(57) ABSTRACT

The invention provides a method and system for selectively canceling a specified frequency band in the payload of an optical communication system. This selected frequency band is to be used for launching pilot tones for power measurement and identification. The method controls the intensity of the optical payload signal through an intensity modulator that is included in the optical communication system. The frequency band in payload to be cancelled is removed where as the other frequency components of the payload are passed without attenuation. An embodiment that uses a feed-forward unit, a feedback unit and a control unit for generating a cancellation signal for the intensity modulator is described. An advantage of the method is that it removes a continuum of payload tones in the specified frequency band to be cancelled.

16 Claims, 4 Drawing Sheets

Detailed Payload Cancellation Scheme

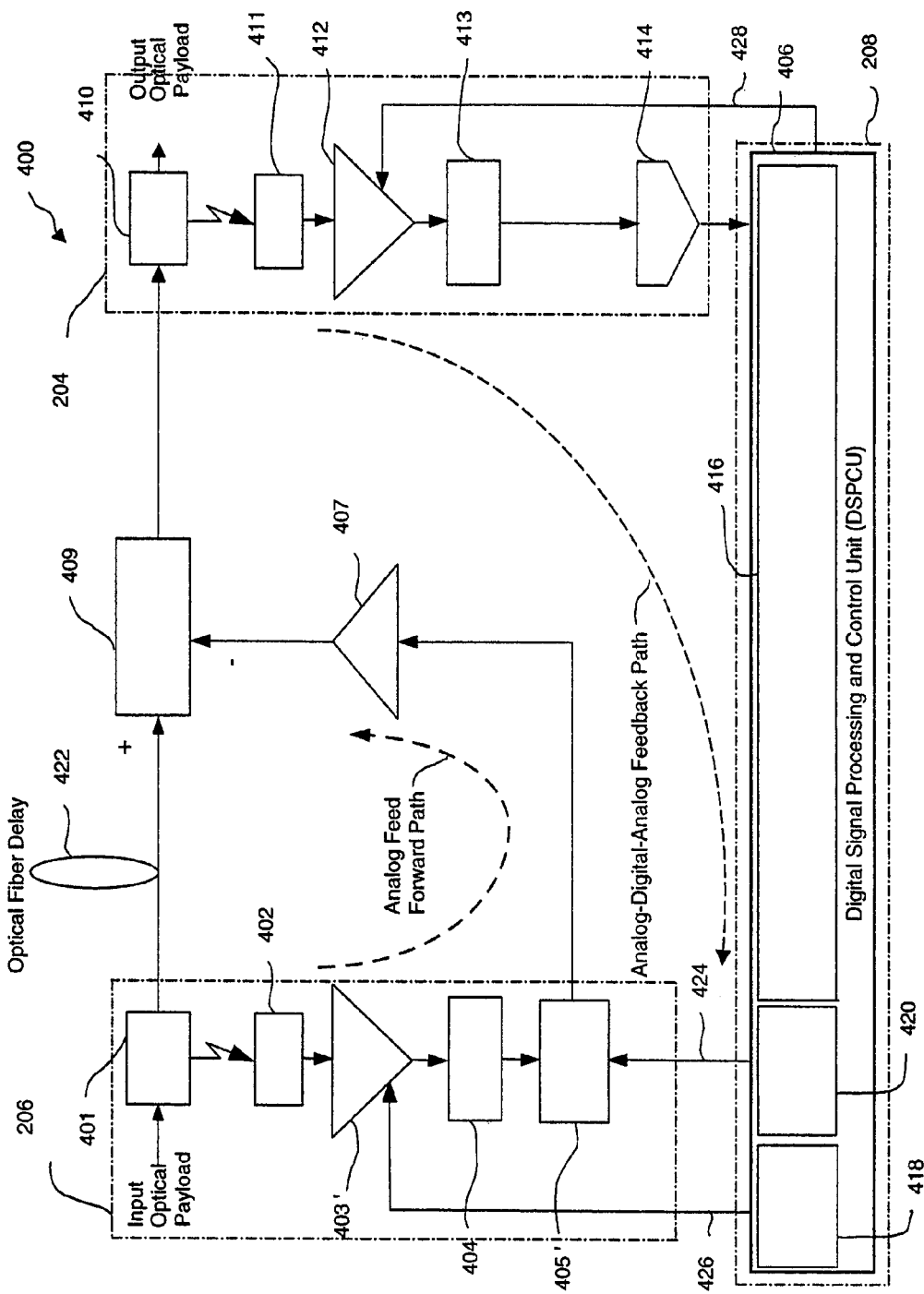
Figure 4. Detailed Payload Cancellation Scheme

METHOD AND SYSTEM FOR SELECTIVE OPTICAL PAYLOAD CANCELLATION

RELATED APPLICATION

This application claims priority from U.S. Provisional Patent Application Ser. No. 60/429,552 to Remedios, D., et al, entitled "Low Frequency Optical Payload Cancellation", and filed on Nov. 29, 2002.

FIELD OF INVENTION

This invention relates to optical communication systems, and in particular to a method and system for cancellation of a selected frequency band in the payload for an optical communication system.

BACKGROUND OF INVENTION

Pilot tones are often encoded on to the payload signal (payload tone) of an optical communications system (OCS) for optical power measurements and identification. A selected frequency band within the payload spectrum in which pilot tones are to be launched require to be removed from the payload signal before encoding the pilot tones, so that the payload signal does not interfere with the pilot tones.

FIG. 1(a) shows the electrical spectrum of a payload, with respect to encoded pilot tones used for optical power measurements and identification. The correlated component of the payload tones in the specified narrow band ($\Delta f$) (see FIG. 1(b)) that may mimic pilot tones are spurious and need to be removed because they interfere with the function of pilot tone measurement and identification. A very small power penalty for canceling this small portion of the payload is incurred for encoding the clean pilot tones (used for power measurements and detection) within the deleted portion.

An apparatus for adding a dither signal to an optical carrier that is modulated with payload information is considered by Fatehi et al. (U.S. Pat. No. 5,892,606) wherein dither or pilot or sub-carrier modulated tones are pure discrete deterministic tones. In contrast payload tones within the continuous frequency band are functions of the payload transmission rate, bit modulation format, payload frame format, as well as payload frame content including continuous uncorrelated and correlated portions of the payload tones (pseudorandom characteristics). Due to these structural differences between payload tones and pilot tones, there is a need to target the removal of a continuum of correlated spurious payload tones, spanning the frequency band of the target pilot tones.

SUMMARY OF INVENTION

Therefore there is an objective of the invention to provide a method and system for cancellation of a selected frequency band in the payload in an optical communication system. In view of the previous discussion, it is also an objective of the present invention to provide a method and system for canceling a continuum of correlated optical payload tones in a selected frequency band.

According to one aspect of the invention there is provided a method for selective payload cancellation in an optical communication system (OCS), including an Intensity Modulator for selectively controlling the intensity of payload of the OCS, the method comprising steps of: extracting and processing signal from an input of the Intensity Modulator; extracting and processing signal from an output of the Intensity Modulator; estimating amplitude and phase of a frequency band in a payload to be cancelled by a Digital Signal Processing and Control Unit (DSPCU); producing output signals of said DSPCU using the extracted and processed signals from the input and the output of the Intensity Modulator; and generating a cancellation signal using the output signals produced by the DSPCU and the extracted and processed signal from the input of the Intensity Modulator, and canceling the frequency band in the payload to be cancelled. The step of extracting and processing signal from the input of the Intensity Modulator comprises the steps of: tapping input payload signal at the input of the Intensity Modulator; converting the tapped input payload signal into input electrical signal using an optical to electrical converter; and processing said input electrical signal. The step of extracting and processing signal from the output of the Intensity Modulator comprises the steps of: tapping output payload signal at the output of the Intensity Modulator; converting the tapped output payload signal into output electrical signal using an optical to electrical converter; and processing said output electrical signal. The step of estimating amplitude and phase of the frequency band in the payload to be cancelled comprises the steps of: extracting the amplitudes and phases of spectral components of the frequency band in the payload to be cancelled using a DFT (Digital Fourier Transform) of the processed output electrical signal using an Amplitude and Phase Estimator within the DSPCU; and computing an effective amplitude and phase for each spectral component of the frequency band in the payload to be cancelled by the DSPCU. The step of producing the output signals of the DSPCU comprises the steps of: generating a variable gain control signal by an Adaptive Variable Gain Control Unit in the DSPCU as a first output signal of the DSPCU; generating a variable phase delay control signal by an Adaptive Phase Control Unit in the DSPCU as a second output signal of the DSPCU; and generating a third output signal by the DSPCU for processing the output electrical signal. The step of processing the input electrical signal comprising the steps of: amplifying the input electrical signal in accordance with the first output signal produced by the DSPCU; and filtering the amplified signal for extracting the frequency band in the payload to be cancelled by applying a high order linear band-pass filter. The step of generating the cancellation signal and canceling the frequency band in the payload to be cancelled comprises the steps of: phase matching the input payload signal at the Intensity Modulator and the cancellation signal applied to the Intensity Modulator by a Variable Phase Delay unit, using the second output signal produced by the DSPCU and the extracted and processed input signal; and applying the cancellation signal through a driver to the Intensity Modulator for selectively controlling the intensity of the payload and removing the frequency band to be cancelled in the payload. The step of processing the output electrical signal comprises the steps of: amplifying the tapped output payload signal in accordance with the third output signal produced by the DSPCU; filtering the amplified signal for extracting the frequency band in the payload to be cancelled by applying the high order linear band-pass filter; and converting the filtered output from analog to digital by an Analog to Digital Converter (ADC) for the digital processing performed by the DSPCU.

According to another aspect of the invention there is provided a system for selective payload cancellation in an optical communication system (OCS), including an Intensity Modulator for selectively controlling the intensity of payload of the OCS, the system comprising: means for extracting and processing signal from an input of the Intensity Modulator; means for extracting and processing signal from an output of the Intensity Modulator; a Digital Signal Processing and Control Unit (DSPCU) for estimating amplitude and phase of a frequency band in a payload to be cancelled and for producing output signals using the extracted and processed signals from the input and the output of the Intensity Modulator; and means for generating a cancellation signal using the output signals produced by the DSPCU and the extracted and processed signal from the input of the Intensity Modulator. The means for extracting and processing signals at the input of the Intensity Modulator comprises: an input optical tap for tapping input payload signal at the input of the Intensity Modulator; an optical to electrical converter for converting the tapped input payload signal into input electrical signal; and means for processing said input electrical signal. The means for extracting and processing signals at the output of the Intensity Modulator comprises: an output optical tap for tapping output payload signal at the output of the Intensity Modulator; an optical to electrical converter for converting the tapped output payload signal into output electrical signal; and means for processing said output electrical signal. The DSPCU comprises: an Amplitude and Phase Estimator for estimating a frequency band in the payload to be cancelled; an Adaptive Variable Gain Control Unit for generating a variable gain control signal as a first output signal of the DSPCU; and an Adaptive Phase Delay Control Unit for generating a phase delay control signal as a second output of the DSPCU. The Amplitude and Phase Estimator comprises: means for extracting the amplitudes and phases of the spectral components of the frequency band in the payload to be cancelled using a DFT (Digital Fourier Transform) of the processed output electrical signal; and means for computing an effective amplitude and phase for each spectral component of the frequency band in the payload to be cancelled. The means for processing the input electrical signal comprises: an amplifier for amplifying the input electrical signal in accordance with the first output signal produced by the DSPCU; and a high order linear band-pass filter for filtering the frequency band in the payload to be cancelled. The means for generating the cancellation signal comprises: a Variable Phase Delay unit for phase matching the input payload signal at the Intensity Modulator and the cancellation signal applied to the Intensity Modulator, using the second output signal produced by the DSPCU and the extracted and processed input signal; and a driver for applying the cancellation signal to the Intensity Modulator for selectively controlling the intensity of the payload and removing the frequency band to be cancelled in the payload. The means for processing the output electrical signal comprises: an amplifier for amplifying the output electrical signal in accordance with a third output signal produced by the DSPCU; a high order linear band-pass filter for extracting the frequency band in the payload to be cancelled; and an Analog to Digital Converter (ADC) for converting the analog signal at the output of said high order linear band-pass filter from analog to digital for the digital processing performed by the DSPCU.

The described method and system selectively cancels a frequency band in the payload of an optical communication system for launching pilot tones that are deployed for power measurement and identification. An advantage of the method is that it removes a continuum of payload tones in the specified frequency band to be cancelled, as opposed to the prior art methods that remove only a single tone.

BRIEF DESCRIPTION OF THE DRAWINGS

Further features and advantages of the invention will be apparent from the following description of the embodiment, which is described by way of example only and with reference to the accompanying drawings, in which:

FIG. 4 shows the system for the selective payload cancellation of FIG. 2 in more detail.

DETAILED DESCRIPTION OF PREFERRED EMBODIMENT

The proposed selective payload cancellation method employs a combination of both feed-forward and feedback schemes to achieve reliable cancellation of a specified frequency band in the optical payload. Let a correlated spurious modulation content on the input payload signal at the input of an Intensity Modulator (IM) included in an OCS be given by $I_i(t) = \mathrm{Re}\{I_{iM}(t)\exp(\omega t + \theta_i(t))\}$. Assuming monitoring tap losses are negligible (usually a few percent) and that the inherent loss and phase change at the IM is negligible, the output of the payload cancellation module is given by:

$$I_o(t-\tau_E) = I_{iM}(t-\tau_E)\cos[\omega(t-\tau_E) + \theta_i(t-\tau_E)]\{1 - I_{iM}(t)\exp(\sigma_E)\cos[\omega(t) + \theta_i(t) + \theta_E]\},$$

where $\sigma_E$ is the propagation and phase delay experienced by the electrical path, $\theta_E$ is the phase change experienced by the electrical path, and $\sigma_E$ is the gain of the electrical path. For the coherent correlated spurious modulation content on the optical payload at the input the propagation and phase delay time $\tau_E$ is very much lower than the temporal coherence time ($\tau_C$) of the spurious modulation; thus for the cancellation of this modulation:

$$I_i(t-\tau_E) \approx I_i(t) \text{ (correlated signal)},$$

$$\sigma_E = -\ln(I_{iM}(t)) \text{ (amplitude matching) and}$$

$$\theta_E = -(\omega\tau_E \pm 2\pi) \text{ (phase matching)}$$

Figure 1:
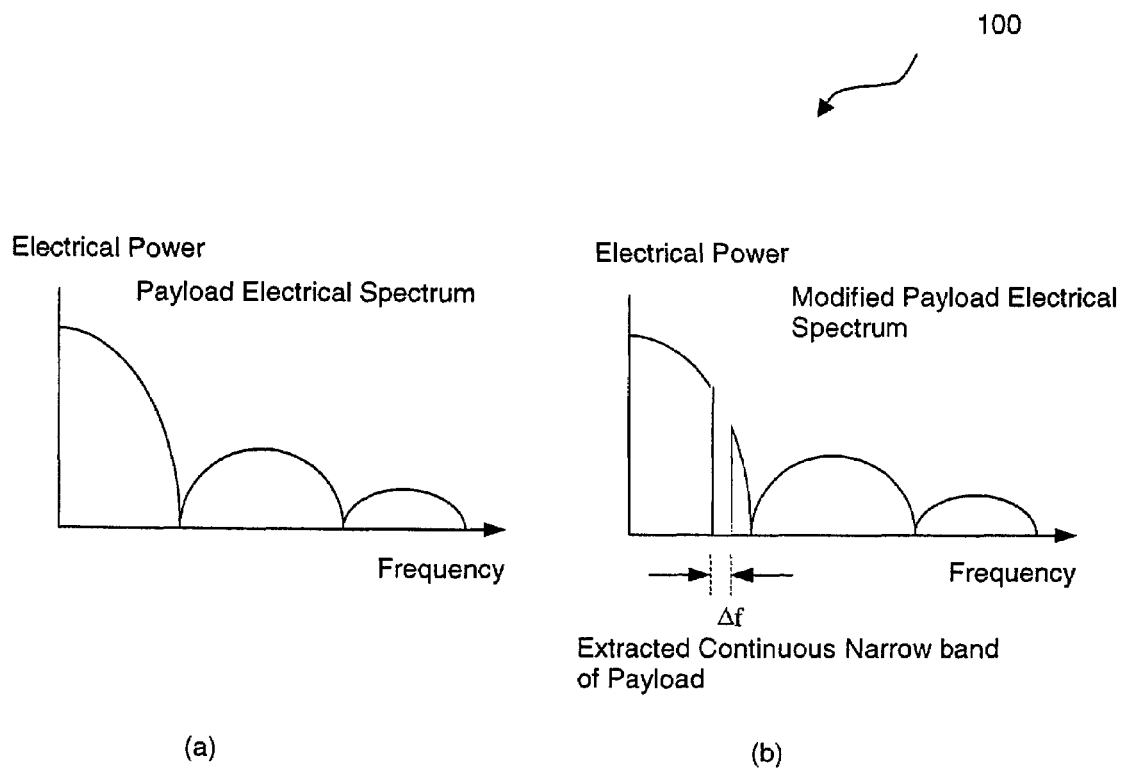
FIG. 1(a) illustrates the payload electrical power spectrum assuming a continuum of correlated payload signals within a bandwidth of $\Delta f$.
FIG. 1(b) illustrates the modified payload spectrum after canceling the frequency band $\Delta f$ in payload.
Figure 2:
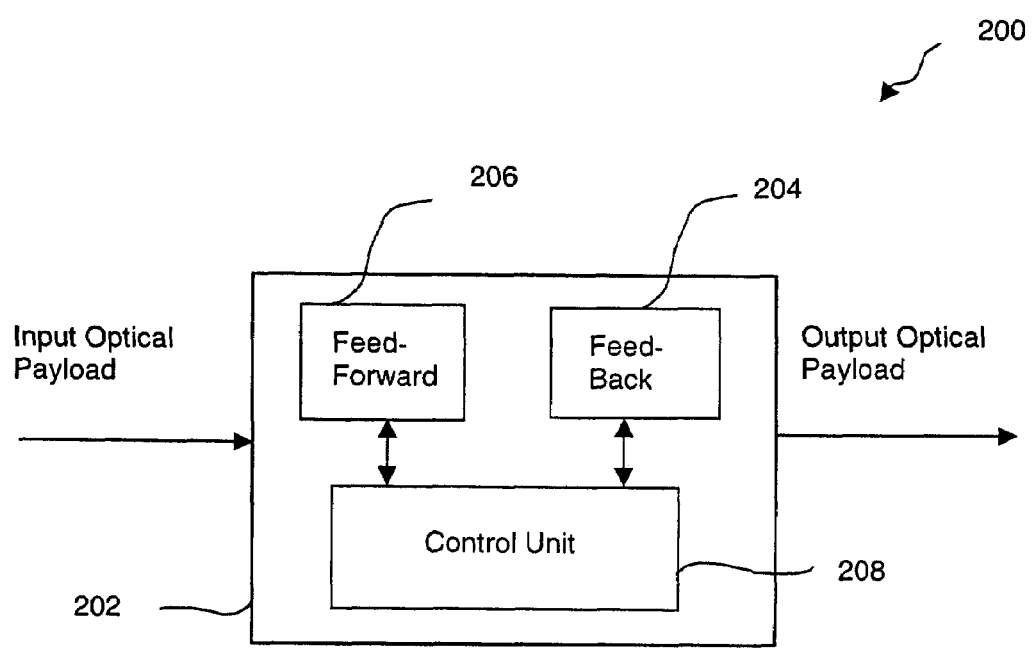
FIG. 2 shows a high level diagram for selective payload cancellation.

The payload cancellation technique implemented in the embodiment of the invention is explained with the help of System 200 of FIG. 2. As shown in FIG. 2, System 200 comprises a selective optical payload cancellation unit 202, which takes the input payload signal of an OCS as input, cancels the specified frequency band, and produces an output payload signal. System 200 includes feed-forward and feedback units 206 and 204 respectively for payload cancellation, and a control unit 208. The feedback unit 204 that corresponds to the feedback path, monitors the output payload signal and provides information about the amplitude and phase of the frequency band to be cancelled to the control unit 208 that performs computations and generates signals for the feed-forward and feedback units that further generate signals for canceling the frequency band in payload to be cancelled. The feed-forward unit 206 that corresponds to the feed-forward path, is used for the generation of an appropriate cancellation signal for deleting the payload signal in the frequency band in payload to be cancelled.

Figure 3:
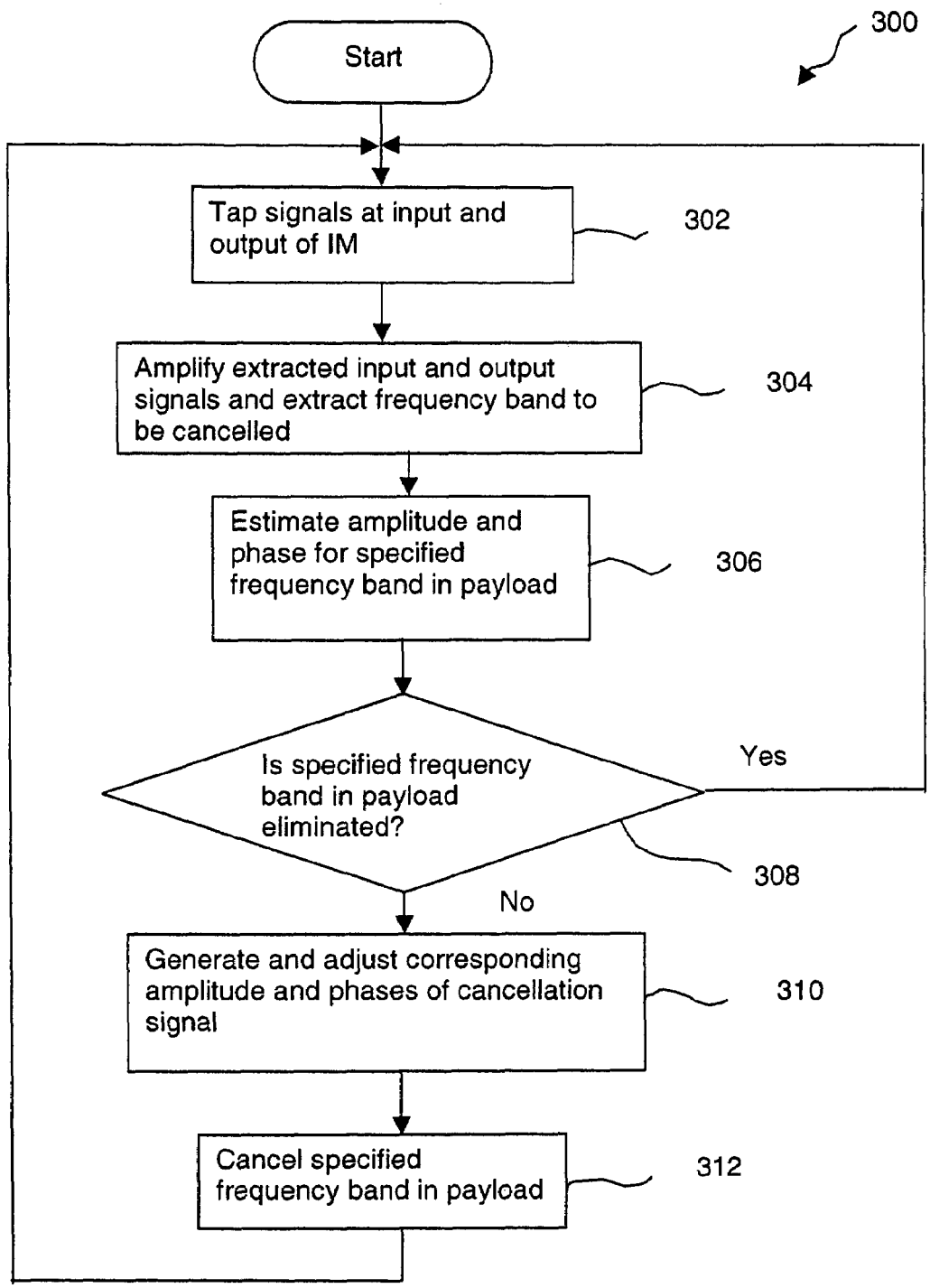
FIG. 3 presents a flowchart that illustrates the steps of the method employed for selective payload cancellation.

Main steps of the method for selective payload cancellation are explained with the help of the flowchart presented in FIG. 3. Upon start, optical signals are tapped from the input and output of the Intensity Modulator (IM) (box 302). By using optical to electrical converters, the tapped optical signals at the input and output of the IM are converted into an input electrical signal and an output electrical signal respectively. In the next step (box 304) these weak electrical signals are amplified, and signals in the frequency band to be cancelled are extracted with the help of band-pass filters to produce an extracted and processed input signal and an extracted and processed output signal. The amplitude and phase of the extracted and processed output signal in the selected frequency band to be cancelled are computed (box 306). If the frequency band in payload to be cancelled is eliminated from the output payload, the procedure exits via route "Yes" from box 308. Otherwise, the procedure exits via route "No" from box 308, and a cancellation signal is generated (box 310). The cancellation signal is then applied to the IM in the OCS for deleting only the frequency band in payload to be cancelled (box 312). After exiting box 312 the procedure goes back to the input of box 302 and repeats the cycle.

The system 200 of FIG. 2 is explained in more detail in FIG. 4. The payload cancellation unit is used with an OCS that includes an IM 409. The payload cancellation unit 202 includes a feed-forward unit 204, a feedback unit 206 and a control unit 208. The feed-forward unit 204 includes an Input Tap 401, an optical to electrical converter, for example, a photodiode 402, a Variable Gain amplifier 403, a band-pass filter 404, a Variable Phase Delay unit 405 and a driver 407 (see FIG. 4). The Input Tap 401 is connected to the input of the photodiode 402. The output of the photodiode 402 is connected to the input of the Variable Gain amplifier 403 that drives the band-pass filter 404. The output of the band-pass filter 404 is connected to the input of the Variable Phase Delay unit 405. The output of the Variable Phase Delay unit 405 is connected to the input of the driver 407 the output of which is connected to the Intensity Modulator 409. The feedback unit 206 includes an Output Tap 410, an optical to electrical converter, for example, a photodiode 411, a Variable Gain amplifier 412, a band-pass filter 413 and an Analog to Digital Converter (ADC) 414. The Output Tap 410 is connected to the input of the photodiode 411. The output of the photodiode 411 is connected to the input of the Variable Gain amplifier 412 that drives the band-pass filter 413. The output of the band-pass filter 413 is connected to the input of the ADC 414. The control unit 208 includes a Digital Signal Processing and Control Unit (DSPCU) 406 which in turn includes an Amplitude and Phase Estimator 416, an Adaptive Phase Delay Control unit 420 and an Adaptive Variable Gain Control Unit 418. The output of the ADC 414 is connected to the input of the DSPCU 406. The DSPCU 406 has three outputs. The first output 426 is connected to the input of the Variable Gain Amplifier 403. The second output 424 is connected to the Variable Phase Delay unit 405 and the third output 428 is connected to the Variable Gain Amplifier 412. The specified frequency band in payload to be cancelled is deleted with the help of an IM 409 that is used for controlling the intensity of payload signals in different frequency bands. The input payload signal is applied to the input of IM 409. By applying a cancellation signal generated with the help of a Digital Signal Processing and Control Unit (DSPCU) 406, only the specified frequency band in payload is deleted from the output payload whereas the payload signals at all other frequencies are passed without any attenuation. The method of payload cancellation uses a feed-forward as well as a feedback path. The feedback path detects under and over compensation by the DSPCU 406 and is used to modify the outputs of the DSPCU 406 appropriately. The feed-forward path applies the corrected amplitude and phase for the cancellation signal derived from the DSPCU 406 to the IM 409.

Small portions of both the input and output payloads are extracted with the help of the Input Tap and the Output Tap 401 and 410 respectively. These extracted input and output optical payload signals are converted into an input electrical signal and an output electrical signal with the help of slow-speed photodiodes 402 and 411 (box 302 in FIG. 3). The input electrical signal and the output electrical signal are then amplified by precision low-noise linear amplifiers with variable gain 403 and 412 that amplify the weak extracted payload to levels appropriate for further processing. The high order linear band-pass filters 404 and 413 are used to extract payload signals in the frequency band to be cancelled (box 304 in FIG. 3). Using linear phase is important for maintaining a constant delay within the passband. In addition, the phase delay is kept small. The extracted and processed input signal available at the output of the band-pass filter 404, is processed by a Variable Phase Delay Unit 405 that is used for matching the phase delay between the Input Tap 401 and output of the optical dither and the phase delay through the amplifier 403 and band-pass filter 404. Note that the gain of the amplifiers 403 and 412 as well as the phase delay introduced by the Variable Phase Delay unit 405 are controlled with the help of the outputs of the DSPCU 406, that uses the information carried by the feed-back path to produce the appropriate correction signals. The cancellation signal with the corrected amplitude and phase available at the output of the Variable Phase Delay unit 405 (box 310 in FIG. 3) is then applied with the help of a driver 407 to control the IM 409 and delete the frequency band in payload to be cancelled (box 312 of FIG. 3).

The feedback path processes the output payload signal. The output electrical signal from the photodiode 411 is amplified by the Variable Gain Amplifier 412. The band-pass filter 413 extracts the frequency band in payload to be cancelled and its output is converted from analog to digital by using an analog-to-digital converter (ADC) 414. The Amplitude and Phase Estimator 416 in the DSPCU 406, then uses the extracted and processed output signal. Sampling the extracted and processed output signal from the ADC 414 provides amplitude and phase estimation for the frequency band in the payload to be cancelled (box 306 in FIG. 3). The amplitudes and phases of the spectral components of the frequency band to be cancelled are obtained from the Digital Fourier Transform (DFT) of the sampled signal. Using current and past values (over short time intervals) of the amplitudes and phases for each payload spectral component to be cancelled, an effective amplitude and phase are computed using a minimization algorithm, for example, the Levenberg-Marquardt Algorithm described in the following three references: [1] Brown K. M., et al, "*Derivative Free Analogues of the Levenberg-Marquardt and Gauss Algorithms for Nonlinear Least Squares Approximation*", Numerical Methods, Vol. 18, pp. 289–297, 1972; [2] Levenberg K., "*A Method for the Solution of Certain Nonlinear Problems in Least Squares*", Quarterly of Applied Mathematics, Vol. 2, pp. 164–168, 1944; and [3] Marquardt D. W., "*An Algorithm for Least Squares Estimation of Nonlinear Parameters*", Journal of the Society of Industrial and Applied Mathematics (SIAM), Vol. 11, pp. 431–441, 1963; and, regarding Simulated Annealing, a paper by Kirkpatrick S., et al, entitled "*Optimization by Simulated Annealing*", Science, 220 (4598), pp.—671–680, 1983. The minimization algorithm is implemented in two modules: the Adaptive Variable Gain Control unit (module) 418 and the Adaptive Phase Delay Control unit (module) 420. The two modules are dependent and are adaptive in the sense that the effective gain and phase delays are continuously computed over short time intervals. The adjustments of the amplitude and phase of the cancellation signal are performed continuously until the desired optical payload output is yielded while taking into account small changes due to component variations. The first output signal 426 from the DSPCU 406 is applied to the Variable Gain Amplifier 403 and the second output signal 424 from the DSPCU 406 is applied to the Variable Phase Delay Unit 405 in the feed-forward path for controlling the IM 409 that cancels the selected frequency band in payload. The third output signal 428 from the DSPCU is is used for controlling the Variable Gain Amplifier 412.

Thus the embodiments of the present invention provide a method and a system for canceling a selected frequency band in the payload of an OCS.

An advantage of the method is that it removes a continuum of payload tones in the specified frequency band to be canceled, as opposed to the methods of the prior art that remove only single tones.

Numerous modifications and variations of the present invention are possible in light of the above teachings. For example, an optional fiber coil 422 can be used to introduce propagation delay in the optical domain. This optical fiber delay loop can be used for optical path-to-electrical path phase matching.

It is therefore to be understood that within the scope of the appended claims, the invention may be practised otherwise than as specifically described herein.

We claim:

1. A method for selective payload cancellation in an optical communication system (OCS) including an Intensity Modulator for selectively controlling the intensity of payload of the OCS, the method comprising steps of:
   extracting and processing signal from an input of the Intensity Modulator;
   extracting and processing signal from an output of the Intensity Modulator;
   estimating amplitude and phase of a frequency band in a payload to be cancelled by a Digital Signal Processing and Control Unit (DSPCU);
   producing output signals of said DSPCU using the extracted and processed signals from the input and the output of the Intensity Modulator, and the estimated amplitude and phase of the frequency band in the payload to be cancelled; and
   generating a cancellation signal using the output signals produced by the DSPCU, and canceling the frequency band in the payload to be cancelled.

2. A method as claimed in claim 1, wherein the step of extracting and processing signal from the input of the Intensity Modulator comprises the steps of:
   tapping input payload signal at the input of the Intensity Modulator;
   converting the tapped input payload signal into input electrical signal using an optical to electrical converter; and
   processing said input electrical signal.

3. A method as claimed in claim 2, wherein the step of processing the input electrical signal comprising the steps of;
   amplifying the input electrical signal in accordance with the first output signal produced by the DSPCU; and
   filtering the amplified signal for extracting the frequency band in the payload to be cancelled by applying a high order linear band-pass filter.

4. A method as claimed in claim 1, wherein the step of estimating amplitude and phase of the frequency band in the payload to be cancelled comprises the steps of:
   extracting the amplitudes and phases of spectral components of the frequency band in the payload to be cancelled using a DFT (Digital Fourier Transform) of the processed output electrical signal using an Amplitude and Phase Estimator within the DSPCU; and
   computing an effective amplitude and phase for each spectral component of the frequency band in the payload to be cancelled by the DSPCU.

5. A method as claimed in claim 1, wherein the step of producing the output signals of the DSPCU comprises the steps of:
   generating a variable gain control signal by an Adaptive Variable Gain Control Unit in the DSPCU as a first output signal of the DSPCU;
   generating a variable phase delay control signal by an Adaptive Phase Control Unit in the DSPCU as a second output signal of the DSPCU; and
   generating a third output signal by the DSPCU for processing the output electrical signal.

6. A method as claimed in claim 1, wherein the step of extracting and processing signal from the output of the Intensity Modulator comprises the steps of:
   tapping output payload signal at the output of the Intensity Modulator;
   converting the tapped output payload signal into output electrical signal using an optical to electrical converter; and
   processing said output electrical signal.

7. A method as claimed in claim 6, wherein the step of processing the output electrical signal comprises the steps or:
   amplifying the tapped output payload signal in accordance with the third output signal produced by the DSPCU;
   filtering the amplified signal for extracting the frequency band in the payload to be cancelled by applying the high order linear bandpass filter; and
   converting the filtered output from analog to digital by an Analog to Digital Converter (ADC) for the digital processing performed by the DSPCU.

8. A method as claimed in claim 1, wherein the step of generating the cancellation signal and canceling the frequency band in the payload to be cancelled comprises the steps of:
   phase matching the input payload signal at the Intensity Modulator and the cancellation signal applied to the Intensity Modulator by a Variable Phase Delay unit, using the second output signal produced by the DSPCU and the extracted and processed input signal; and
   applying the cancellation signal through a driver to the Intensity Modulator for selectively controlling the intensity of the payload and removing the frequency band to be canceled in the payload.

9. A system for selective payload cancellation in an optical communication system (OCS), including an Intensity Modulator for selectively controlling the intensity of payload of the OCS, the system comprising:

means for extracting and processing signal from an input of the Intensity Modulator;

means for extracting and processing signal from an output of the Intensity Modulator;

a Digital Signal Processing and Control Unit (DSPCU) for estimating amplitude and phase of a frequency band in a payload to be cancelled and for producing output signals using the extracted and processed signals from the input and the output of the Intensity Modulator, and the estimated amplitude and phase of the frequency band in the payload to be cancelled; and means for generating a cancellation signal using the output signals produced by the DSPCU.

10. A system as claimed in claim 9, wherein the means for extracting and processing signals at the input of the Intensity Modulator, comprises:

an input optical tap for tapping input payload signal at the input of the Intensity Modulator;

an optical to electrical converter for converting the tapped input payload signal into input electrical signal; and means for processing said input electrical signal.

11. A system as claimed in claim 10, wherein the means for processing the input electrical signal comprises:

an amplifier for amplifying the input electrical signal in accordance with the first output signal produced by the DSPCU; and a high order linear bandpass filter for filtering the frequency band in the payload to be cancelled.

12. A system as claimed in claim 9, wherein the DSPCU comprises:

an Amplitude and Phase Estimator for estimating a frequency band in the payload to be cancelled;

an Adaptive Variable Gain Control Unit for generating a variable gain control signal as a first output signal of the DSPCU; and an Adaptive Phase Delay Control Unit for generating a phase delay control signal as a second output of the DSPCU.

13. A system as claimed in claim 12, wherein the Amplitude and Phase Estimator comprises:

means for extracting the amplitudes and phases of the spectral components of the frequency band in the payload to be cancelled using a DFT (Digital Fourier Transform) of the processed output electrical signal; and means for computing an effective amplitude and phase for each spectral component of the frequency band in the payload to be cancelled.

14. A system as claimed in claim 9, wherein the means for extracting and processing signals at the output of the Intensity Modulator, comprises:

an output optical tap for tapping output payload signal at the output of the Intensity Modulator;

an optical to electrical converter for converting the tapped output payload signal into output electrical signal; and means for processing said output electrical signal.

15. A system as claimed in claim 14, wherein the means for processing the output electrical signal comprises:

an amplifier for amplifying the output electrical signal in accordance with a third output signal produced by the DSPCU;

a high order linear bandpass filter for extracting the frequency band in the payload to be cancelled; and an Analog to Digital Converter (ADC) for converting the analog signal at the output of said high order linear bandpass filter to digital for the digital processing performed by the DSPCU.

16. A system as claimed in claim 9, wherein the means for generating the cancellation signal comprises:

a Variable Phase Delay unit for phase matching the input payload signal at the Intensity Modulator and the cancellation signal applied to the Intensity Modulator, using the second output signal produced by the DSPCU and the extracted and processed input signal; and a driver for applying the cancellation signal to the Intensity Modulator for selectively controlling the intensity of the payload and removing the frequency band to be canceled in the payload.

* * * * *

UNITED STATES PATENT AND TRADEMARK OFFICE
CERTIFICATE OF CORRECTION

| | | |
|---|---|---|
| PATENT NO. | : 7,224,909 B2 | Page 1 of 1 |
| APPLICATION NO. | : 10/635561 | |
| DATED | : May 29, 2007 | |
| INVENTOR(S) | : D. Remedios et al. | |

It is certified that error appears in the above-identified patent and that said Letters Patent is hereby corrected as shown below:

Column 7, line 40, "(OCS) including" is corrected to be read as --(OCS), including--.

Column 8, line 3, "of;" is corrected to read as --of:--.

Column 8, line 42, "or:" is corrected to read as --of:--.

Column 8, line 48, "bandpass" is corrected to read as --band-pass--.

Column 9, line 29, "bandpass" is corrected to read as --band-pass--.

Column 10, line 22, "bandpass" is corrected to read as --band-pass--.

Column 10, line 26, "bandpass" is corrected to read as --band-pass--.

Signed and Sealed this

Fifth Day of August, 2008

JON W. DUDAS
*Director of the United States Patent and Trademark Office*